No. 678,413. Patented July 16, 1901.
J. LEYLAND.
MOUNTING WHEELS ON VEHICLES.
(Application filed Jan. 21, 1901.)
(No Model.)

WITNESSES:
F. Stallman
H. M. Flannery

INVENTOR
J. Leyland
By Oscar T. Gunn
his ATTORNEY.

THE NORRIS PETERS CO., PHOTO-LITHO., WASHINGTON, D. C.

UNITED STATES PATENT OFFICE.

JAMES LEYLAND, OF RUTHERFORD, NEW JERSEY.

MOUNTING WHEELS ON VEHICLES.

SPECIFICATION forming part of Letters Patent No. 678,413, dated July 16, 1901.

Application filed January 21, 1901. Serial No. 44,099. (No model.)

*To all whom it may concern:*

Be it known that I, JAMES LEYLAND, a citizen of the United States, and a resident of Rutherford, in the county of Bergen and State of New Jersey, have invented certain new and useful Improvements in Mounting Wheels on Vehicles, of which the following is a specification.

This invention relates to improvements in mounting wheels on vehicles.

The object of my invention is to mount the wheels on vehicles in such a manner that the axle is not weakened in any way, need not be turned down to form an axle-bearing, need not have securing devices for holding the wheel in place applied on the axle outside of the outer ends of the hubs, is simple in construction, strong, effective, and durable, and can be applied on wheels and axles of all kinds.

Figure 1:
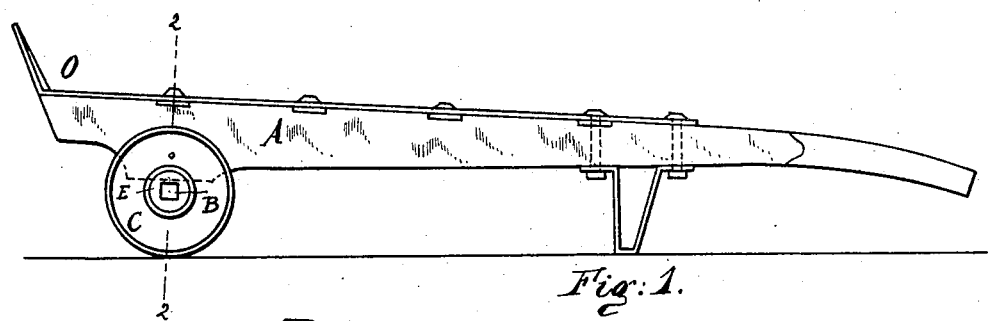
Figure 2:
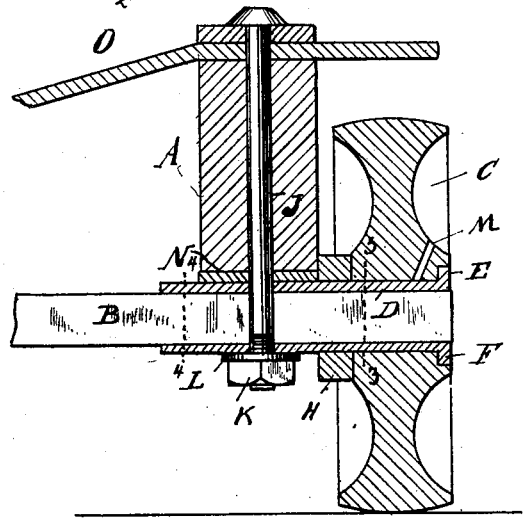
Figure 3:
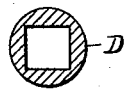
Figure 4:
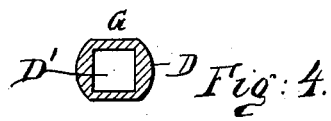
Figure 6:
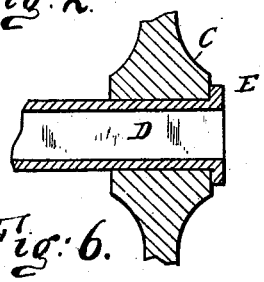
Figure 5:
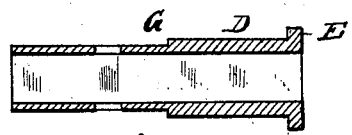

In the accompanying drawings, in which like letters indicate like parts in all the views, Figure 1 is a side view of a hand-truck provided with my improvement. Fig. 2 is an enlarged transverse vertical sectional view on the line 2 2 of Fig. 1. Figs. 3 and 4 are detail transverse vertical sectional views on the lines 3 3 and 4 4, respectively, of Fig. 2. Fig. 5 is a longitudinal sectional view of the sleeve.
Fig. 6 shows a slight modification.

I have illustrated and will now describe my invention as applied on an ordinary hand-truck; but it is as equally well applicable to any other wheeled vehicles, such as a cart, carriage, dray, &c.

In the drawings the side bars of the frame of a hand-truck are represented by the letter A. These side bars are the equivalents of those parts in other vehicles, such as mentioned, to which the axles are attached—for example, the springs where springs are used or a frame supporting the springs and body.

The axle B is composed of a square or rectangular bar of steel or iron of sufficient length to extend to the outer ends of the hubs of the wheels C, which in this case are represented as solid cast-iron wheels, but which, as is very evident, may be of any other suitable construction. A sleeve D, having a square or rectangular bore D' of proper size for receiving the axle B, has the outer end part of its outer surface turned off cylindrically, so as to adapt it to be passed through the bore of the hub of the wheel C. The sleeve D is provided at its outer end with an annular flange E, which fits into an annular recess F, turned in the outer end of the wheel-hub, as shown in Fig. 2, or may rest against the outer end of said hub, as shown in Fig. 6. That part of the sleeve D that is to rest against the side bar A or spring or other analogous part of the vehicle is flattened on its top, as at G, and preferably, also, at its bottom. A washer-ring H is placed upon the sleeve D adjacent to the inner end of the hub of the wheel, as shown in Fig. 2. A bolt J is passed through the side bar A or its equivalent, as above mentioned, and through corresponding holes in the sleeve D and axle B, and a nut K is screwed on its lower end, a washer L being interposed between the nut K and the sleeve D, or in place of the nut a spring-key or analogous device may be used. The bolt J thus holds all the parts in place.

To remove the wheel, the bolt J is first withdrawn. Then the sleeve D and the wheel C and washer-ring H thereon are pulled lengthwise off the axle, and after the washer-ring H has been slipped off the sleeve the wheel can be removed, to be replaced by another.

The parts are secured in place in substantially the inverse order as described above.

M is an oiling-hole for the wheel.

N is a bearing-plate on the under side of the bar A, and O is the iron frame of the truck.

It will be observed that the bolt J, which holds the axle to the frame or analogous part of the vehicle, holds the wheel on the axle by means of the sleeve D and that the wheel can only be removed after removing this bolt and slipping off the sleeve D.

Having described my invention, what I claim as new, and desire to secure by Letters Patent, is—

1. In a vehicle, the combination with an axle of a bolt for holding the axle in place on the vehicle-frame, a sleeve on the end of the axle and provided with a flange at its outer end, a wheel mounted on said sleeve, the said flange resting against the outer end of the hub, the above-mentioned bolt passing through said sleeve substantially as herein shown and described.

2. In a vehicle, the combination with an axle, rectangular in cross-section, of a sleeve having a bore to receive the end of said axle and having its outer surface turned cylindrically, a flange being formed on the outer end of the sleeve, a wheel mounted on the sleeve, the said flange resting against the outer end of the hub, and a bolt passing through said sleeve and axle substantially as herein shown and described.

3. In a vehicle, the combination with an axle, rectangular in cross-section, of a sleeve having a bore shaped to receive the end part of the axle and having its outer surface shaped cylindrically, said sleeve having a flange at its outer end, a wheel mounted on said sleeve, the said flange resting against the outer end of the hub, a washer-ring mounted on said sleeve at the inner side of the wheel and a bolt passing through said sleeve into the axle, substantially as herein shown and described.

Signed at New York, in the county of New York and State of New York, this 18th day of January, A. D. 1901.

JAMES LEYLAND.

Witnesses:
OSCAR F. GUNZ,
N. M. FLANNERY.